United States Patent [19]

Knable et al.

[11] Patent Number: 4,711,463
[45] Date of Patent: Dec. 8, 1987

[54] VEHICLE SUSPENSION STRUT AND UPPER MOUNT ASSEMBLY THEREFOR

[75] Inventors: Joseph J. Knable, Fenton, Mich.; Donald C. Ferdelman, Kettering, Ohio; Gerald M. Bojanowski, Mt. Clemens, Mich.

[73] Assignee: General Motors Corporation, Detroit, Mich.

[21] Appl. No.: 871,776

[22] Filed: Jun. 9, 1986

[51] Int. Cl.[4] ............................................. B60G 11/42
[52] U.S. Cl. .................................... 280/668; 267/195; 267/286
[58] Field of Search ...................... 280/668, 663, 96.1; 267/8 R, 20 A, 35

[56] References Cited

U.S. PATENT DOCUMENTS

| | | | |
|---|---|---|---|
| 4,175,770 | 11/1979 | Draisbach et al. | 267/20 A |
| 4,235,426 | 11/1980 | Sullivan, Jr. et al. | 267/35 |
| 4,462,608 | 7/1984 | Lederman | 267/8 R |
| 4,474,363 | 10/1984 | Numazawa et al. | 280/668 |
| 4,618,127 | 10/1986 | LeSalver et al. | 267/8 R |

FOREIGN PATENT DOCUMENTS 2158549 11/1985 United Kingdom ................. 267/35

Primary Examiner—John J. Love
Assistant Examiner—Ross Weaver
Attorney, Agent, or Firm—Charles R. White

[57] ABSTRACT

An upper mount assembly for a suspension strut which incorporates an elastomer bushing operatively connecting the piston rod to support structure that works in shear over initial travel but has compression load buildup at the limit of mount travel. The mount assembly is a unitized multi-element construction having a jounce bumper to provide a load path for suspension spring assist and a load deflection curve to improve suspension characteristics. In this invention, load buildup is achieved in jounce and rebound with the use of a rate washer which is moved upwardly by the strut in jounce movement. Initial travel works the bushing in shear but the elastomer becomes compressed between the washer and an outside metal wall to provide increasing spring rate. When the rod moves vertically downwardly in rebound, the washer controls the load buildup and compresses the upper portion of the jounce bumper for soft entry into rebound.

6 Claims, 4 Drawing Figures

VEHICLE SUSPENSION STRUT AND UPPER MOUNT ASSEMBLY THEREFOR

This invention relates to suspension struts for vehicles and more particularly to an upper mount assembly for effectively coupling a suspension strut to support structure in a vehicle providing improved spring suspension and ride and improved jounce and rebound control.

The upper mount and jounce bumper assembly of the present invention provides a unit which can be readily installed on top of the strut and on the piston rod extending upwardly therefrom. This assembly has two main subassemblies comprised of (1) and upper plate and piston rod bushing assembly and (2) a jounce plate and jounce bumper assembly. These subassemblies can be quickly attached to one another to form the unitized upper mount assembly of the present invention. A dust tube can be attached to the lower end of the jounce bumper to form part of the upper mount assembly if needed.

The upper plate and piston rod bushing assembly has a sheet metal bushing mount plate comprised of a generally flat upper mounting flange for attachment to a mount tower or other support structure in the vehicle. The bushing mount plate also has a generally cylindrical wall or neck portion depending downwardly from the central portion of this plate and defines an upper opening aligned with an opening in the mount tower. The cylindrical wall surrounds and is bonded to the outer wall of a generally cylindrical piston rod bushing of elastomeric material. Bonded to an inner cylindrical wall of the elastomeric bushing is a tubular metallic mounting sleeve which is adapted to slidably fit on a reduced diameter end of the piston rod of the strut. A metallic rate washer, fixed to the lower end of the mounting sleeve for assembly purposes, is sized to seat on a shoulder of the piston rod. On jounce motions, the rate washer enters into the cylindrical wall portion surrounding the bushing to work portions of the elastomeric material of the bushing in shear and in compression causing bulk movement upwardly to cushion and control jounce motion of the piston rod.

The jounce plate and jounce bumper assembly comprises a cup-like jounce bumper connector plate having an upper flange which is adapted to fit under the flange of the mount plate and is adapted to be secured thereto by tab means bent over from the upper plate. The jounce bumper connector plate has a cylindrical wall that depends from its upper flange to encompass the cylindrical wall or neck portion of the bushing mount plate. The lower end of this jounce bumper connector plate is turned radially inwardly to provide an annular opening of predetermined diameter to accommodate the piston rod extending therethrough and the top portion of a jounce bumper which is secured thereto. A large washer-like jounce plate having the same internal diameter as the annular opening in the bottom of the jounce plate is spot welded thereto. The jounce bumper is an elongated generally cylindrical unit of micro cellular polyurethane or other suitable material that fits on the piston rod and is formed with internal and external grooves to provide a selected load dflection curve for full time suspension spring assist and for dissipating jounce energy during jounce motions of the strut. The upper end of the jounce bumper has an external mounting groove adjacent the upper end thereof that closely fits onto the radial attachment wall provided by the jounce plate and the radial wall of the jounce bumper attachment cup. The lower end of the jounce bumper contacts the upper end of the strut provided by a bumper plate fixed thereto. The upper end portion of the jounce bumper fits against the radial lower wall of the jounce plate to provide suspension spring assist.

The jounce bumper has an upper collar portion which extends above the radial attachment wall and is adapted to be contacted by the rate washer or downward movement of the piston rod in rebound to provide a rebound cushion and preferably provides predetermined soft entry into rebound.

In addition to the above, the lower end of the jounce bumper is formed with an annular retainer ring to serve as a resilient and releasable attachment for a plastic dust tube which extends downwardly from the jounce bumper around the outer periphery of the strut.

More particularly the upper mount assembly of this invention, has a new and improved bushing mounting assembly provided with an elastomeric bushing operatively mounted between a centralized piston rod mounting sleeve and a surrounding wall of the bushing mounting plate to operatively connect the piston rod to support structure in the vehicle. When operating on a smooth roadway, bushing isolates the piston rod from the vehicle body with a low spring rate so that excessive vibration and noise are not transmitted to the passenger compartment of the vehicle. A rate washer fixed to the piston rod is used to obtain the buildup of load in the elastomer piston rod bushing as the rod moves vertically upwardly in jounce action. Initially when moved in jounce, the elastomer rod bushing is worked in shear but becomes compressed between the rate washer and the surrounding wall of the upper plate. Spring rate is controlled by the geometry of the washer, the shape of the bushing and the characteristics of the elastomer used for the bushing. When the strut rod moves vertically downwardly in the rebound direction, the rate washer controls rebound load buildup. More particularly, the load increases in the rebound direction as a result of compressing an upper portion of the jounce bumper. The rate characteristics are controlled by the geometry of the upper portion of the jounce bumper in contact with the rate washer and the material characteristics of the jounce bumper. The new and improved rate washer of this invention has a positive stop position limits the over travel of the mount. Furthermore, this invention provides a new and improved jounce bumper which provides a load path for suspension spring assist that is designed to provide a load deflection curve to meet predetermined suspension characteristics.

These and other features, objects and advantages of this invention will be more apparent from the following description and drawing in which.

Figures 1, 2, 3, 4:
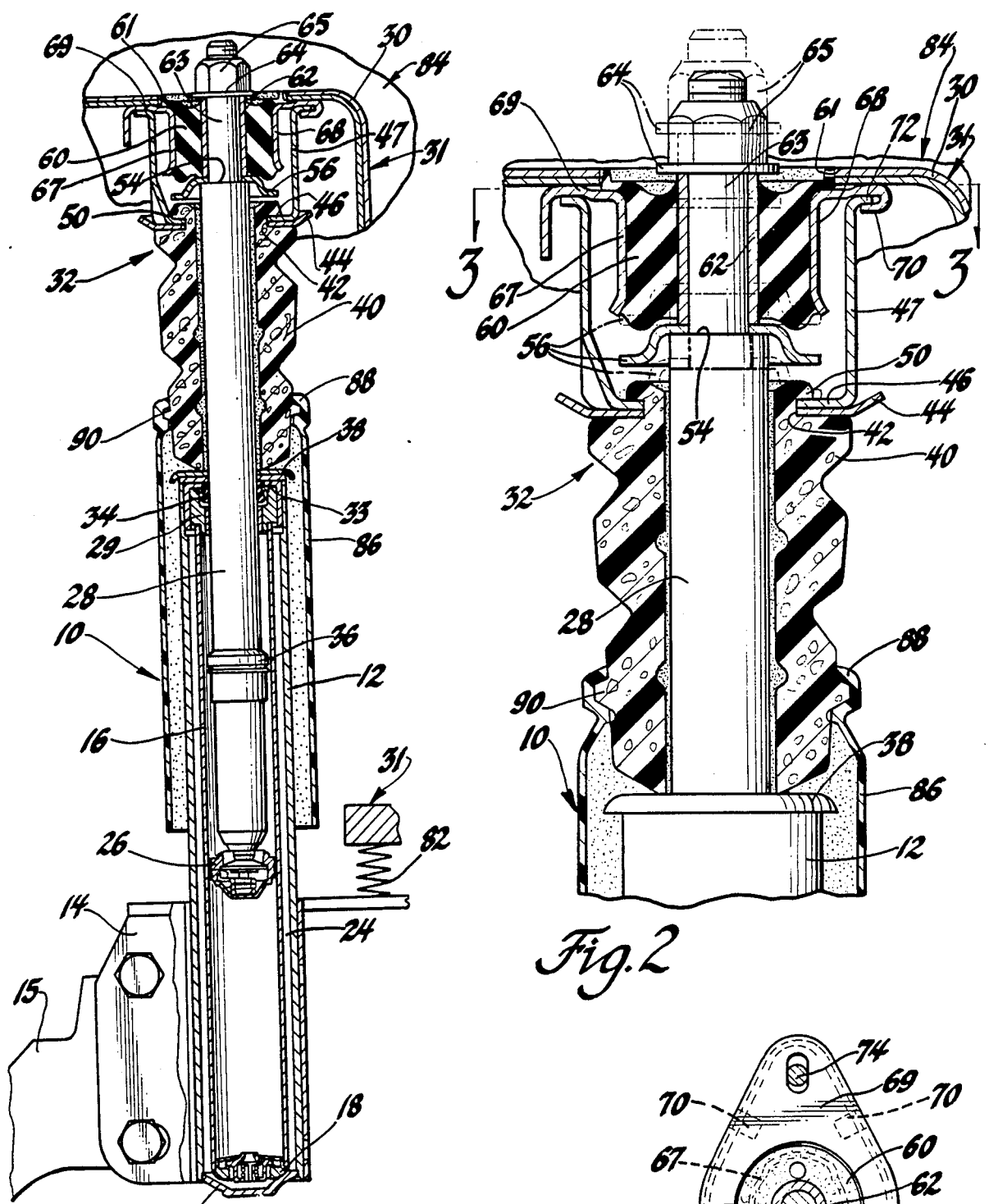
FIG. 1 is an end view partially in cross section and partially diagrammatic of a suspension strut and upper mount therefor according to this invention.
FIG. 2 is an enlarged view of an upper end of the strut and the upper mount therefor.
FIG. 3 is a top view taken generally along lines 3—3 of FIG. 2.
FIG. 4 is a curve showing operation of the jounce bumper providing suspension spring assist in jounce operation.

Turning now in greater detail to the drawing, there is shown in FIG. 1 a suspension strut 10 having an elongated outer support tube 12 with a bracket 14 fixed at its lower end for connection to a vehicle road wheel assembly 15 with the road wheel not shown. Concentrically disposed within the outer tube is a cylinder tube 16 which has at its lower end a base valve 18 seated on an end plate 20 of the outer tube. The base valve 18 controls the flow of shock absorber fluid between the interior of the cylinder tube and the reservoir 24 that is formed between the outer tube 12 and the cylinder tube 16. Mounted for reciprocating movement in the cylinder tube 16 is a valved piston 26 and a piston rod 28 welded or otherwise secured thereto. From the piston 26 the piston rod 28 extends upwardly through a rod guide 29, mounted in the upper end of the cylinder tube, and into attachment with the mounting tower 30 or other support structure in the sprung part 31 of the vehicle by means of the upper mount and jounce bumper assembly 32 as will be further described.

The rod guide is fixed within the upper end of the cylinder tube 16 by a cover plate 33 that is welded or otherwise secured to the outer tube 12. A lip seal 34 seated in the rod guide and retained in place by the cover plate 33 operatively fits around the piston rod to prevent fluid leakage from the cylinder tube and blocks entry of foreign matter into the cylinder tube. A rebound stop 36, welded or otherwise secured to the piston rod within the cylinder tube, is adapted to contact the lower end of the rod guide 29 to positively limit rebound motion as the strut elongates in this action.

Welded or otherwise fixed to the upper surface of the seal cover 33 is a bumper plate 38 through which the piston rod 28 extends. This bumper plate is a generally flat washer-like member which extends radially beyond the limits of the cylinder tube and forms a contact for the lower end of a generally cylindrical jounce bumper 40 which is of a visco-elastic material such as a micro cellular polyurethane foam that has predetermined load deflection characteristics for cushioning jounce motion and providing suspension spring assist. Preferably this bumper provides a variable rate spring with low rate during initial contact and progressively increasing high rate as the strut moves further into jounce toward a terminal jounce position. The upper end of the jounce bumper 40 is formed with a reduced diameter neck to form an annular groove 42 which provides a fitting for a washer-like jounce plate 44 and the radial, inwardly-extending lower end wall 46 of a metallic jounce bumper connector cup 47. The lower end wall 46 of the jounce bumper connector cup is welded or otherwise fixed to the jounce plate 44 to form a jounce plate assembly. The polyurethane foam jounce bumper 40 has an integral thick collar portion 50 disposed on top of the end wall 46 within the connector cup 47 to provide a rebound cushion when the strut moves in rebound.

As shown in FIGS. 1 and 2, the piston rod 28 is shouldered at 54 and receives an annular metallic rate washer 56 seated thereon. In jounce action, the rate washer can crowd into the generally cylindrical elastomer piston rod bushing 60 as shown in dotted lines in FIG. 2 to cushion jounce stroke of the piston with the spring rate increasing with piston jounce travel. The tower 30 has an opening 61 allowing the upward bulk movement of bushing 60 during this action. The piston rod bushing 60 has an internal diameter bonded to a tubular metal sleeve 62 that fits on the reduced diameter upper end portion 63 of the piston rod 28 extending upwardly from shoulder 54. The metallic sleeve and the piston rod bushing 60 are retained on the piston rod by an upper flat washer 64 and a top nut 65 threaded on the end of the piston rod 28 until the rate washer 56 is in firm contact with the shoulder 54 of the piston rod 28.

The outer surface of the elastomer piston rod bushing 60 is bonded to the interior surface of a generally cylindrical neck 67 of metallic bushing mount plate 68. From the upper end of the neck 67, the bushing mount plate has an outwardly extending top flange 69 to fit against the under side of the mounting tower 30 for subsequent attachment thereto. Sleeve 62, elastomer bushing 60, the bushing mount plate 68 and rate washer 56 are joined to provide the upper plate and rod bushing assembly. The top flange of the bushing mount plate has downwardly depending tabs 70 that are bent around the mating flange 72 of the jounce bumper connector cup 47 to secure the upper plate and bushing assembly to the jounce cup and bumper assembly. Conventional threaded fasteners 74 extend through openings in the tower and through the flanges 69 and 72 of bushing mount plate 68 and cup 47 to secure the upper mount and jounce bumper assembly to the mounting tower.

The unitized top mount and jounce jumper assembly can be readily slipped onto the piston rod as a unit and locked in position by the nut 65. The piston rod bushing and mounting plate 68 are enclosed and environmentally protected by the cup 47 and the jounce bumper 40.

In FIGS. 1 and 2, the strut is shown in normal position. The jounce bumper in parallel with the main suspension spring 82 shown diagrammatically in FIG. 1 provides supplemental spring support of the vehicle body. In jounce, the jounce bumper deflects and provides suspension spring assist as illustrated by the load travel curve of FIG. 4. Accordingly, as the bumper 40 is deflected in jounce, the polyurethane foam is compressed to a fraction of its illustrated shape of FIGS. 1 and 2 to provide rapidly increasing resistance to jounce motion. Spring assist is shown in FIG. 4 with the load curve segment A is illustrating an initial progressively increasing resistance to jounce at a travel at a selected rate. As the jounce bumper 40 is further compressed, the spring rate increases as shown by segment B of the curve. As the bumper plate 38 approaches the jounce plate 44, the jounce bumper is fully compressed as shown by curve segment C and full jounce loads are transmitted to the lower jounce plate and cup 47 and the vehicle body without any further appreciable cushioning of the jounce action by the jounce bumper.

The plastic dust tube 86 has a reduced diameter upper end 88 which slip fits onto the resilient annular connector rib 90 of the jounce bumper. The upper end of the dust tube controls deformation of the lower portion of the jounce bumper as the jounce bumper is deflected by the bumper plate. The dust tube being connected to the jounce bumper forms part of the assembly.

The elastomer piston rod bushing 60 provides a variable rate spring connecting the piston rod to the mounting tower in the vehicle 84. As the piston rod reciprocates in the cylinder tube as in normal highway cruising, piston rod motions are isolated by the bushing 60 which is initially worked in shear to provide a low rate spring. On jounce that may occur when the road wheel encounters a bump, the rate washer is moved vertically upwardly toward a terminal position shown in dotted lines. Initial travel of the rate washer works the material of the mount in shear but the elastomer soon is worked in compression between the washer and the outside metal of the shear mount and the spring rate accordingly increases. The rate is controlled by the geometry of the washer, the shape of the bushing metal and the characteristics of the mount itself. At full jounce, the rate washer contacts the bottom part of the neck 67 of the bushing mount plate which provides a stop for limiting the excessive deflection of the bushing.

On rebound the outer collar portion 50 of the jounce bumper will be contacted by the rate washer as shown in the lower dotted line position to control and cushion the movement of the piston downwardly as it strokes in rebound to provide soft entry in rebound.

As will be appreciated, the whole upper mount provides an assembly which can be readily installed as a unit onto the strut and then the strut moved into position on the vehicle and secured thereto with the threaded fasteners 74.

While a preferred embodiment of this invention has been shown and described to illustrate the invention, other modifications will become more apparent to those skilled in the art. Accordingly, the scope of this invention is set forth in the following claims.

The embodiments of the invention in which an exclusive property or privilege is claimed are defined as follows:

1. In a vehicle having suspension spring means operatively interposed between a road wheel assembly and a vehicle body, a suspension strut assembly for mounting said vehicle road wheel to support structure associated with said body and movable in jounce and rebound, a cylinder tube having a hydraulic fluid therein, a support tube disposed around said cylinder tube and having a lower end operatively connected to the vehicle road wheel assembly, a valved piston operatively mounted for reciprocating movement in said cylinder tube having a piston rod operatively connected thereto and extending out of said cylinder tube and said support tube, said piston rod being operatively connected to said vehicle body so that said piston controls vehicle ride motions, the improvement comprising an upper strut mount assembly, a first mounting plate fixed to said support structure, a piston rod bushing of resilient material having an outer wall operatively secured to said mounting plate and having an internal wall, means operatively securing said internal wall to an upper portion of said piston rod, a second mounting plate secured with respect to said support structure, resilient cushion means secured to said second mounting plate and spaced from said piston rod bushing yieldably supporting said outer support tube, a rate washer mounted on said piston rod immediately below said piston rod bushing for directly contacting and working said bushing in shear and compression during jounce motions of said strut and said piston rod while said cushion means is compressed by said cylinder tube to dissipate jounce loads said cushion means being subjected to compression load by said rate washer to dissipate rebound loads.

2. In the vehicle defined in claim 1, wherein said cushion means comprises a jounce bumper of resilient cellular material having an upper portion secured in a fixed position to said second mounting plate below said bushing and said rate washer for direct contact with and deflection by said rate washer on rebound motion of said strut to cushion rebound loads of said piston rod.

3. In a vehicle having suspension spring means operatively interposed between a road wheel assembly and a vehicle body, a suspension strut assembly for mounting said vehicle road wheel to support structure associated with said body, a cylinder tube having a hydraulic fluid therein, a support tube disposed around said cylinder tube and having a lower end operatively connected to a vehicle road wheel assembly, a piston operatively mounted in said cylinder tube having a piston rod operatively connected thereto and extending out of said cylinder tube and said support tube for linear movement in jounce and rebound, the improvement comprising a contact plate fixed to the upper end of said support tube, an upper mount assembly operatively connecting said strut to said support structure, said upper mount assembly having an elastomer bushing disposed radially outward of an upper end portion of said piston rod, connector means operatively connecting said piston rod to said bushing, a washer on said rod for working said bushing in shear and compression on jounce motion of said piston rod, an upper support plate, a piston rod bushing of resilient elastomer material mounted to said upper support plate and having an internal diameter secured relative to an upper portion of said piston rod, a jounce bumper attachment plate secured to said upper support plate, a resilient jounce bumper operatively secured to said attachment plate and directly engaging said contact plate to provide full time suspension spring assist and to cushion jounce action of said strut as it moves on toward said support structure, said jounce bumper having a collar portion deflected in response to rebound loads applied by said washer to cushion rebound action as said strut moves away from said support structure.

4. In a vehicle having suspension spring means operatively interposed between a road wheel assembly and a vehicle body, a suspension strut assembly for mounting said vehicle road wheel to support structure associated with said body, a cylinder tube having a hydraulic fluid therein, a support tube disposed around said cylinder tube and having a lower end operatively connected to a vehicle road wheel assembly, a piston operatively mounted in said cylinder tube having a piston rod operatively connected thereto and extending out of said cylinder tube and said support tube, the improvement comprising a unitized upper mount assembly operatively connecting said strut to said support structure, an upper support plate, a piston rod bushing of elastomeric material mounted to said upper support plate and having an internal diameter secured relative to upper portion of said piston rod, a jounce bumper attachment plate secured to said upper plate, an elastomer jounce bumper operatively secured to said attachment plate having a lower part to provide suspension spring assist and having an upper part to cushion jounce action of said strut as it moves on toward said support structure, and a rate washer mounted on said piston rod to work the material of said bushing and said jounce bumper to cushion jounce and rebound action of said piston rod.

5. The upper mount assembly of claim 4 wherein said piston rod bushing is mounted in parallel with said jounce bumper to isolate said piston rod from said support structure to diminish the transmission of vibratory energy to said vehicle body.

6. An upper mount assembly for securing a wheel suspension strut to support structure within a sprung portion of a vehicle comprising an upper plate and bushing assembly for coupling the piston rod of said strut to said support structure, said bushing assembly having an outer metallic bushing mounting plate with a neck portion, an elastomer bushing secured in said neck portion, a sleeve disposed around the upper portion of said piston rod and attached to said bushing, a rate washer disposed beneath said bushing and secured to said piston rod for working said bushing in shear and in compression against the outer wall of said upper plate assembly to cushion jounce action of said strut and a resilient cushion operatively disposed beneath said rate washer providing spring support for said vehicle and for contact by said rate washer to cushion rebound action of said strut.

* * * * *